INVENTORS
JAMES D. DURKEE,
CLARENCE H. STEWART
and WILLIAM E. PEUGH

BY Burns, Doane, Benedict & Irons
ATTORNEYS

May 15, 1962 J. D. DURKEE ET AL 3,035,250

SELECTIVE CALLING SYSTEM

Filed Aug. 13, 1956 4 Sheets-Sheet 2

INVENTORS
JAMES D. DURKEE,
CLARENCE H. STEWART
and WILLIAM E. PEUGH

BY Burns, Doane, Benedict & Irons
ATTORNEYS

SELECTIVE CALLING SYSTEM

Filed Aug. 13, 1956

INVENTORS
JAMES D. DURKEE,
CLARENCE H. STEWART
and WILLIAM E. PEUGH

BY Burns, Doane, Benedict & Irons
ATTORNEYS

INVENTORS
JAMES D. DURKEE,
CLARENCE H. STEWART
and WILLIAM E. PEUGH

BY Burns, Doane Benedict & Irons
ATTORNEYS

United States Patent Office 3,035,250
Patented May 15, 1962

3,035,250

SELECTIVE CALLING SYSTEM

James D. Durkee, Springbrook, Ark., and Clarence H. Stewart and William E. Peugh, Evanston, Ill., assignors, by mesne assignments, to Bell & Gossett Company, Morton Grove, Ill., a corporation of Illinois Filed Aug. 13, 1956, Ser. No. 603,607
13 Claims. (Cl. 340—171)

This invention relates generally to a calling system wherein one or more of a plurality of remotely located receivers may be selectively called and/or an operation performed at such selected receiver or receivers, all performed from a remote transmitting station. More particularly, the invention is directed to a system for selectively signaling remotely located receiving stations through the medium of audio frequency signals where each independent signal, which may be representative of a particular digit as used in a call number for a station, is made up of a first phase single frequency tone and a second phase single frequency tone.

Taking for example the conventional practice in radio intercommunication systems and certain control systems, it has been usual to operate such systems on a general call basis. That is, the information is transmitted to all parties on a particular frequency or circuit with the differentiation between particular calls and control functions being undertaken by the personnel listening in at the various receiving locations. This type of operation has generally resulted in many miscalls, lowered operator efficiency and required extra personnel, since the operator is required to give continuous attention at all times to the information being transmitted to select the proper information intended for his particular receiving station.

Various so-called selective calling systems have been proposed in an attempt to overcome the disadvantages present in the practice of operating intercommunication systems on a general call basis. Generally, such prior selective calling systems have relied upon transmission of the calling signals either in the form of a particular number of pulses of a particular frequency, or in signaling by the use of separate frequency signals to call a particular receiver with which the transmitter desires to communicate. The pulse-type signaling as used in selective calling, particularly in radio communication, possesses the obvious defect that noise pulses and general interference may very well result in the intended receiver not detecting the complete number of pulses to which it is to respond or in responding to mere noise pulses at times when the receiver is not intended to be called.

A further shortcoming in previously used selective calling systems is their inherent limitation as to the total number of receiving stations which may be accommodated by the system and limitation on the particular call numbers which may be assigned to the individual receiving stations. Thus, in many prior systems, even where separate frequency signals are used in the calling operation, it has not been possible to effectively use call numbers which contain the same digits consecutively. Call numbers such as 4466, 4431, 4113, etc. could not effectively be called with any predictable reliability of response of a receiver having such a call number. Additionally, prior proposed selective calling systems using separate frequency signals have required an excessive number of different frequencies for use in the call number signal transmission to be able to accommodate any reasonably acceptable number of receiving stations. Where a single frequency is assigned to identify each digit in the call signal coding, ten different frequencies must be allocated for use in such a system and if the same digit is used consecutively in the call number the receiver must be capable of distinguishing two consecutive pulses of the same frequency thus opening the receiver up to the same drawbacks of improper response as are characteristic of selective calling receivers which respond to groups of pulses of the same frequency.

Having in mind the shortcomings and disadvantages of prior selective calling systems as discussed above, it is a primary object of the present invention to provide a selective calling system employing call number signals made up of two separate frequency tones representative of each digit in the call number wherein the receivers are responsive to the call number signals from the transmitter with high reliability of operation in the presence of noise of a random and impulse type and/or interference from man-made sources such as other communications operations on the same channel.

It is another object of this invention to provide a selective calling system wherein the signal coding employed assigns each digit in a receiver call number two separate audio frequency tones in a particular sequential order as uniquely representing each digit and wherein within the physical parameters of the system components all integers are usable as call numbers for individual receiving stations with equal reliability in receiving station response to the call number signals.

It is a further object of this invention to provide a selective calling system which within the system parameters of the components used therein is capable of being economically expanded with a minimum of change in apparatus construction and wherein extreme simplicity of construction of the system components makes for ease of servicing.

It is an additional object of this invention to provide a selective calling system wherein a receiver may be activated or a predetermined desired operation may be performed at a selected receiving station in response to the call number signals for such station and wherein such receiving station may be deactivated or the performed operation terminated in response to a separate frequency tone sent from the transmitter following the call number signals or alternatively the called receiver may be deactivated at such receiver.

It is also an object of this invention to provide a selective calling system wherein the activate function at a receiver will not be consummated in response to other than a complete proper series of frequency tones representing the call number of the particular receiver even where the receiver commences to respond to call signals which partially correspond to the proper call number signals for the particular receiver and the receiver having commenced response to partially correct call signals will be returned to a condition for reception of its proper call signals after a predetermined time period without proper completion of the call number signals.

A further object of this invention is to provide a selective calling system employing frequency sensitive reeds in the system receiver to function as call signal tone responsive means and wherein reed vibration is quenched immediately following reed response to its resonant drive frequency and threafter the reed quench is released to condition the reed to respond to its resonant frequency drive current from a substantially stable neutral position when a subsequent call signal tone is applied.

In the selective calling system of this invention there is included a transmitter for the generation of appropriate audio frequency signal tones, as used in receiver calling and its control, together with a receiver for recognition of such signal tones and appropriate response and activation upon reception of the proper frequencies and sequence of such tones as represent the call number of the receiver. To obtain the desired degree of operational reliability in the receiver response the signal coding used relies upon two separate single frequencies to uniquely define each of the digits used in a call number. These two frequencies, as sent by the transmitter representing each digit of the number, must be received in the proper sequence for each digit of the receiver call number in order to complete operation or activation at the particular receiver called. In the digit code employed, one of two separate single frequencies is transmitted as the first phase of the signal which represents a given digit followed by the sending of one of five different single frequencies to represent the second phase of the digit signal. The combinations of one of the first phase frequencies with each of the five second phase frequencies and the other of the first phase frequencies with each of the five second phase frequencies enables, by the use of only seven separate frequencies, identification of each of the digits, one through zero, by unique first and second frequency tones.

By reason of the signal coding employed in the selective calling system of the instant invention, wherein two particular frequency tones are employed to uniquely define each digit as used in a call number, the receivers in such system will possess a high reliability in accuracy of response and thus not respond to noise pulses, etc. which might by chance cause response of a receiver where a single frequency tone is relied upon to identify each call number digit. In other words, only on the highly remote chance that two proper frequency noise pulses are detected by a receiver in the selective calling system of this invention could such receiver register a response to even one digit of its call number. Further, since two separate audio frequency tones are required to identify each digit in the signal calling, call number integers having the same digit appearing consecutively are equally reliable for receiving station response with all other call number integers. Even where the same digit appears consecutively in the call number the receiver does not have to distinguish between two pulses of the same frequency as is the case where a single frequency tone is employed as representative of a digit in a call number. In the signaling operation the pair of different frequency tones which uniquely define the digit are repeated in succession to designate a particular call number having digits consecutively the same. Thus, in the selective calling system of this invention, all integers within the physical make-up of the components used in the system are equally reliable as call numbers.

The transmitting apparatus generally incorporates seven separate single audio frequency tone generators along with an additional frequency tone generator employed in the turnoff function where it is desired to discontinue response of a previously called receiver from the transmitting apparatus. A digit selector panel is incorporated in the transmitting apparatus to set up the predetermined call number of the receiving station which is to be called. The transmission of the signals representative of such predetermined call number is effected in the transmitting apparatus by successively sending tones of the appropriate tone generators which are representative of the call number set up on the digit selector panel. In performing the turnoff function, a separate single frequency tone is sent at the end of the frequency tones representative of the receiver call number.

The receiving apparatus embodies separate frequency responsive means individually responsive to one of the tone frequencies which are employed in the selective calling operation, seven of which are employed in representing the digits one through zero and the eighth as used in the turnoff function. A digit selector panel is incorporated to set the receiver for response to a particular call number and a stepping switch provided coupled to the digit selector panel so as to successively step to an activating position in response to the receiver's detection of the proper frequency tones received in proper sequence as determined by the call number set on the digit selector panel. The stepping switch is returned to normal or home position in the event of the receiver responding to an incomplete or only partially correct call when the correct call is not accurately completed within a predetermined time period. Only when the stepping switch is stepped to its final position in response to a proper series of frequency tones for the receiver call number is the activate function carried out by the receiver. The turnoff function may be effected only after a correct call has been responded to by the receiver followed by the receiver's detecting the particular turnoff frequency tone as sent from the transmitter.

Although the selective calling system of this invention finds its primary utility in the field of radio communication, it will be appreciated that the invention is equally applicable to wire circuit communication applications.

The more specific details and significant features of the invention in addition to those generally outlined above will be apparent by reference to the specific description of the illustrated embodiment as set forth hereinafter. Other more specific objects of this invention, in addition to those set forth above, will also be apparent by reference to the specific description taken in connection with the accompanying drawings, in which.

*Description of the Transmitter*

Figure 1:
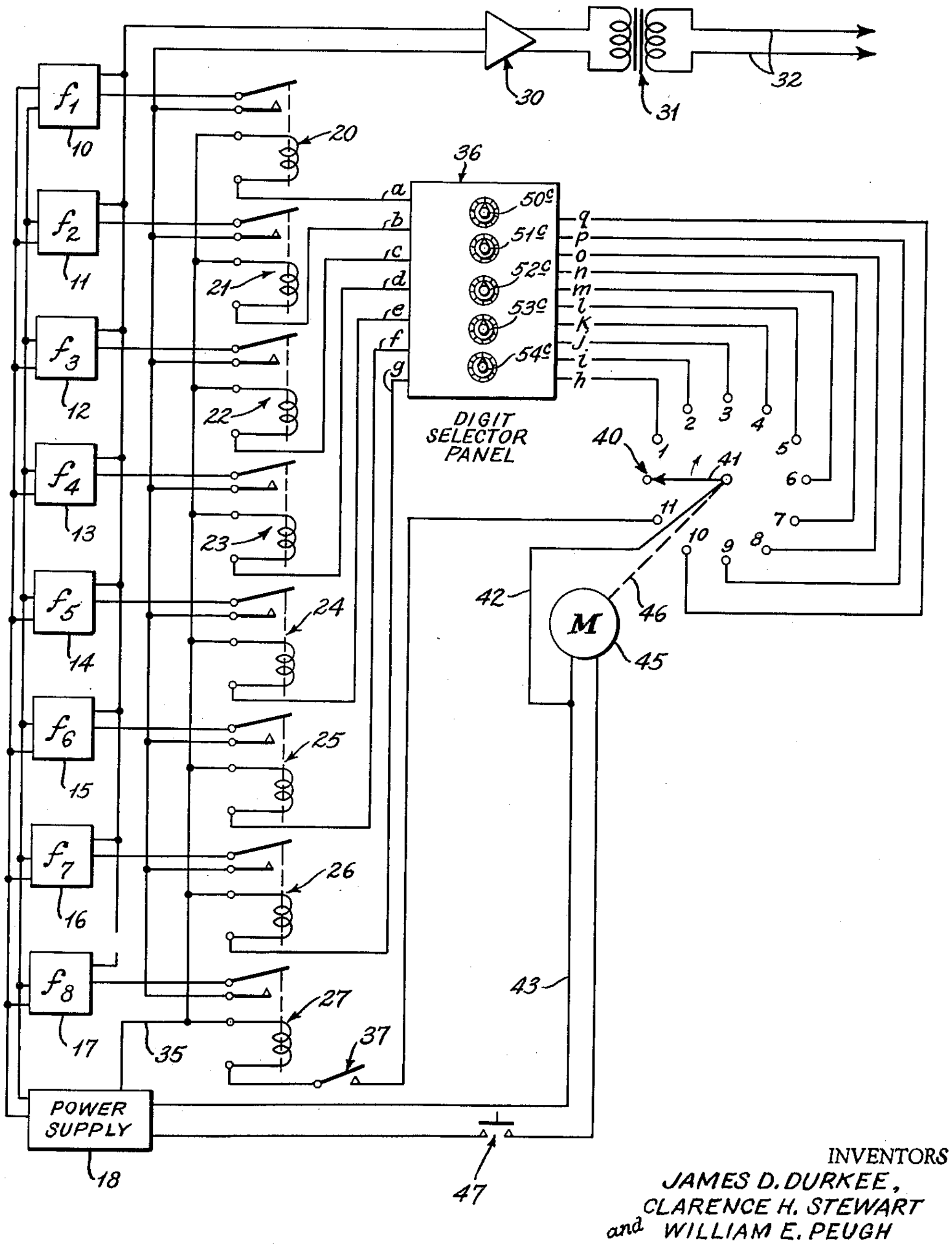
FIGURE 1 is a schematic wiring diagram of a selective calling system transmitter embodying the features of the invention.

A schematic wiring diagram of a transmitter for use in the selective calling system of the instant invention is shown on FIGURE 1. Incorporated in such transmitter there are provided audio frequency generating means which may take the form of individual oscillators as identified by numerals 10, 11, 12, 13, 14, 15, 16 and 17. These oscillators, connected to a power supply 18, provide for eight separate audio frequency tones which may be individually and selectively applied to the transmitter output in sending particular call signals. Relays 20, 21, 22, 23, 24, 25, 26 and 27 are connected respectively in the output circuits of the oscillators 10 through 17 to enable the output frequency of each oscillator to be selectively connected with an audio amplifier 30.

The output of amplifier 30 is transformed to the appropriate impedance level for an output circuit 32 by an output transformer 31 so that the frequency tone may be used from circuit 32 to directly modulate a radio transmitter, in wire transmission, or whatever other means is desired, to communicate with a receiver in operation of the system. The provision of relays 20 through 27 serves to simplify the frequency switching operation and minimize "cross-talk." It will be readily recognized that energization of the coil of ay one of the relays 20 through 27 will effect closing of the contacts of that particular relay to connect the oscillator with which that relay is associated into the output circuit of the transmitter to send the frequency tone of such oscillator.

The audio frequency generating means may be individual oscillators of different frequencies or they may be frequency-controlling components of a master audio oscillator as will be apparent to those skilled in the art. For purposes of further description herein, it will be assumed that the audio frequency generating means are individual oscillators which may be of any suitable type capable of providing satisfactorily uniform audio frequency tone outputs and the details of construction are not shown since such are well known in the art. It will also be recognized that vacuum tube or transistor switching as suitable forms of relay means may be used instead of electromechanical relays 20 through 27 as shown on the drawing.

One side of the energizing coils of the relays 20 through 27 is connected with power supply 18 by means of line 35. The other side of each of the relays 20 through 26 is connected to switches within a digit selector panel 36 as shown more clearly on FIGURE 2 and as will be described in more detail hereinafter. The other side of relay 27, controlling application of turnoff function frequency tone $f_8$ to the transmitter output, is connected through turnoff switch 37 directly to the eleventh contact on a rotary switch 40.

The contacts one through ten on rotary switch 40 are individually connected to the contactors of the switches in the digit selector panel 36. The contactor 41 of switch 40 is shown disposed in its normal or neutral position and is connected by means of lines 42 and 43 back to the power supply. The contactor 41 is suitably rotated by motor 45 through shaft 46 when the motor is energized upon closing of call sending switch 47 which connects the motor to power supply 18. Upon manually closing switch 47, contactor 41 will be caused to sweep across the contacts one through elevent to provied successive energization of relays 20 through 26 as determined by the setting of the selector switches in panel 36, as well be more apparent from the hereinafter set forth description. Also, if turnoff switch 37 is closed during this sweep, relay 27 will be energized to send turnoff frequency tone $f_8$ at the end of the successive call signal tones.

The operation of motor driven rotary switch 40 provides equal pulses of the separate frequency tones which are used as indicative to the digits of the station number being called. For simplicity in illustration, the motor driven rotary switch 40 has been illustrated as being manually operated by closing and opening switch 47. It will be recognized that within the scope of the instant invention it is contemplated that suitable homing relay circuitry may be provided in connection with the energization of motor 45 so that upon starting the motor the contactor 41 will be swept through one complete revolution across each of the switch contacts and stopped when it returns to its neutral position. This one revolution operation of switch 40 may effectively be carried out by providing a motor energizing relay in the motor circuit whereby, once the motor is started by energizing such relay to move contactor 41 toward the first switch contact, a holding circuit for the relay is set up, as through a circular segment rotated with contactor 41, to retain the motor relay contacts closed until the contactor 41 has made one sweep and returned to the home or neutral position.

As referred to hereinabove, the interior circuitry of digit selector panel 36 is shown on FIGURE 2. To facilitate description of the interconnection of the digit selector switches within panel 36 with the relays 20 through 26 and contacts one through ten on switch 40 the various leads are identified by alphabetical letters *a* through *q*.

The selective calling system as illustrated on the drawings is constructed to accommodate a five-digit calling code as determined by the number of pairs of ganged switches in the digit selector panel 36 and the number of contacts provided on rotary switch 40. Since in the signal coding of this invention each digit is represented by two separate frequency tones, a first phase tone followed by a second phase tone, in sending a five-digit call number, ten separate frequency tones are transmitted in succession as effected by one complete rotation of switch 40. The digit selector panel as shown on FIGURE 2 has five pairs of ganged switches, 50*a*—50*b*, 51*a*—51*b*, 52*a*—52*b*, 53*a*—53*b* and 54*a*—54*b*, each pair manually adjustable by means of knobs 50*c*, 51*c*, 52*c*, 53*c* and 4*c* (see FIGURE 1).

For purposes of description of the invention, it will be assumed that the digits one through five are uniquely defined by the frequencies of oscillator $f_1$, followed by $f_3$ for digit 1; $f_1$, followed by $f_4$ for digit 2; $f_1$, followed by $f_5$ for digit 3; $f_1$, followed by $f_6$ for digit 4; and $f_1$, followed by $f_7$ for digit 5. Similarly the digits six through zero will be assumed to be uniquely defined by the frequency generated by oscillator $f_2$ followed by the frequencies of oscillators $f_3$ through $f_7$, respectively.

As previously referred to, oscillator 17 generating frequency $f_8$ is utilized in the instant invention solely to provide a turnoff frequency usable in deactivating a particular receiver which has been called. From the description given so far, it will be appreciated that the code number capacities of the transmitter may be readily expanded to provide for six, seven or more digit call numbers by the appropriate addition of contacts on switch 40 and appropriate addition of ganged pairs of digit selector switches in the digit selector panel.

Figure 2:
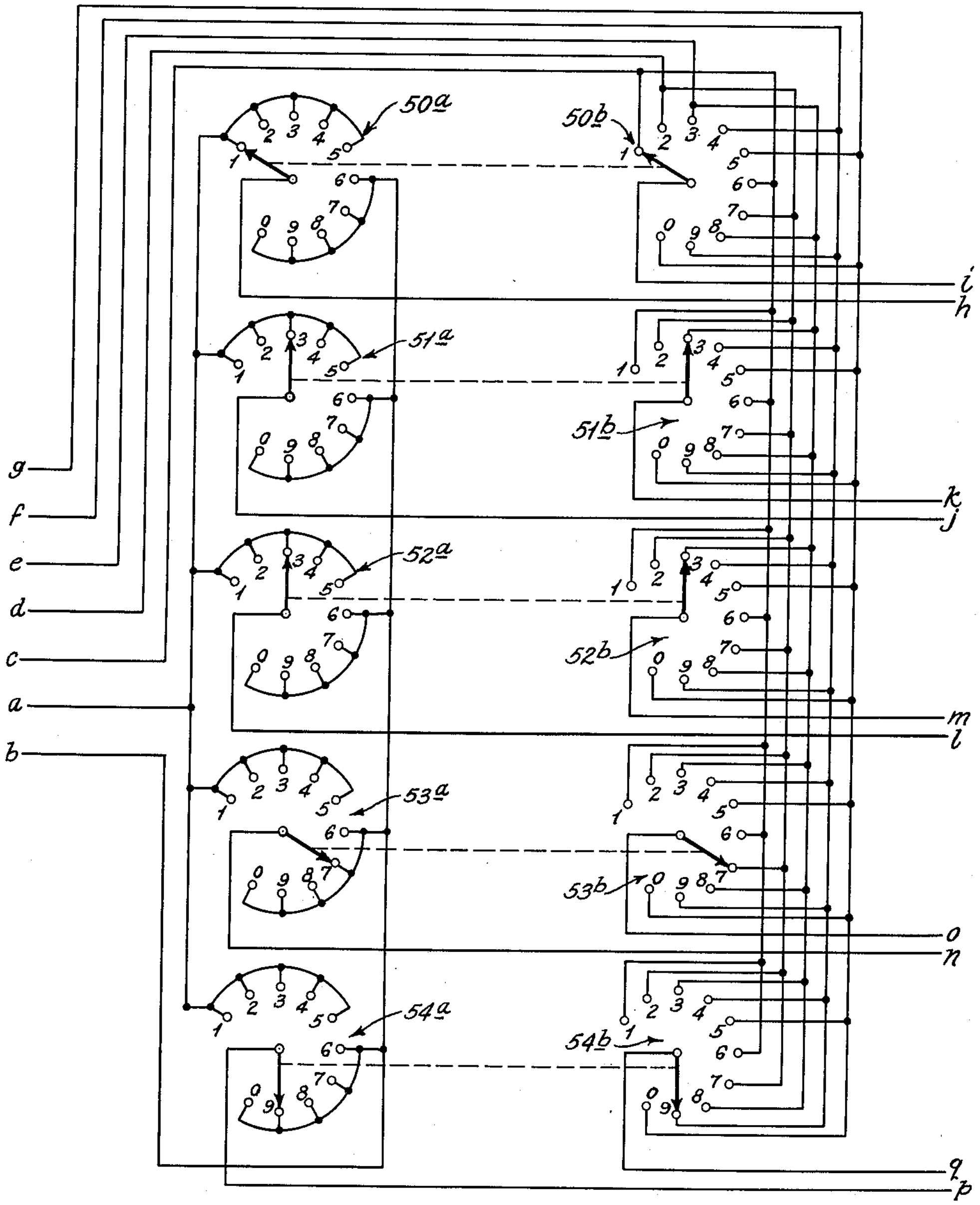
FIGURE 2 is a schematic wiring diagram of a digit selector panel as employed in the selective calling system transmitter and receiver.

Referring further to FIGURE 2, it will be seen that the relays 20 and 21 for the first phase frequency tones $f_1$ and $f_2$ are connected by leads *a* and *b* to the first of the ganged pairs of switches 50*a*, 51*a*, 52*a*, 53*a* and 54*a* in the digit selector panel. In each of these first switches, half of the contacts, one through five, are connected by lead *a* to relay 20 and the remaining contacts, six through zero, connected to lead *b* to relay 21.

Relay 22, which effects coupling of oscillator 12 for frequency $f_3$ to the transmitter output is connected by lead *c* to contacts one and six of each of the switches 50*b*, 51*b*, 52*b*, 53*b* and 54*b* of the ganged switch pairs in the digit selector panel. Similarly, relay 23 is connected by lead *d* to contacts two and seven of the second switch in the ganged pairs in the digit selector panel; relay 24 connected by lead *e* to contacts three and eight; relay 25 connected by lead *f* to contacts four and nine; and relay 26 connected by lead *g* to contacts five and zero on the second of the ganged switch pairs.

The movable contactors of the pairs of ganged switches are connected in succession to the contacts one through ten of rotary switch 40 by means of leads *h* through *q* as shown on FIGURES 1 and 2.

*Operation of the Transmitter*

In FIGURE 2, the digit selector panel 36 is shown as being set, by means of the knobs 50*c*, 51*c*, 52*c*, 53*c* and 54*c*, for the transmitter to send out the call number 13379. With the apparatus so set, the operator desiring to call the particular receiving station having the call number 13379 closes switch 47 to energize motor 45 and drive contactor 41 through shaft 46 to sweep across the contacts of rotary switch 40. It will be appreciated that switch 37 remains open, since its operation is for effecting the turnoff function and is not used in the initial call transmission.

As the contactor 41 moves across contact one a circuit from power supply 18 through line 35, the coil of relay 20, lead *a*, switch 50*a*, lead *h*, contactor 41, leads 42 and 43, will be completed, momentarily energizing relay 20 so that it closes its contacts and applies the frequency $f_1$ of oscillator 10 to the audio amplifier 30, output transformer 31 and thence to output circuit 32. Similarly, as contactor 41 moves across the contacts two through ten on rotary switch 40, a pulse of frequency $f_3$ will be transmitted by momentary energization of relay 22; pulses of frequencies $f_1$ and $f_5$ will be transmitted as contactor 41 passes over the third and fourth contacts of switch 40 to denote digit 3; pulses of frequencies $f_1$ and $f_5$ again transmitted to denote the digit 3 as the third digit of the cell number when contactor 41 passes over the fifth and sixth contacts; frequencies $f_2$ and $f_6$ will be sent to denote the digit 7 as contactor 41 passes over the seventh and eighth contacts; and the signal for the digit 9 will be transmitted by pulses of frequencies $f_2$ and $f_6$ as contactor 41 passes over the ninth and tenth contacts.

Since the circuit to the eleventh contact of switch 40 is open at switch 37, no pulse will be transmitted when contactor 41 moves across the eleventh contact. Again energization of motor 45 for a sufficient length of time to sweep contactor 41 completely around the contacts of switch 40, the motor may be de-energized to stop the contactor 41 on the neutral position. It will, of course, be recognized that the call number may be repeatedly transmitted by continued energizaion of motor 45 to effect several sweeps of contactor 41 around the contacts of switch 40. Also as mentioned hereinabove, a homing relay circuit may be employed in conjunction with energization of motor 45 to effect stopping of contactor 41 at the neutral contact.

When the turnoff signal frequency $f_8$ is to be transmitted, switch 37 is closed and motor 45 energized to sweep contactor 41 over the contacts of switch 40. In passing over the eleventh contact of the switch, relay 27 will be energized and the turnoff frequency from oscillator 17 applied to the amplifier 30, transformer 31 to output circuit 32 immediately after the call signal tones have been sent in succession.

*Description of Receiver*

Figure 3:
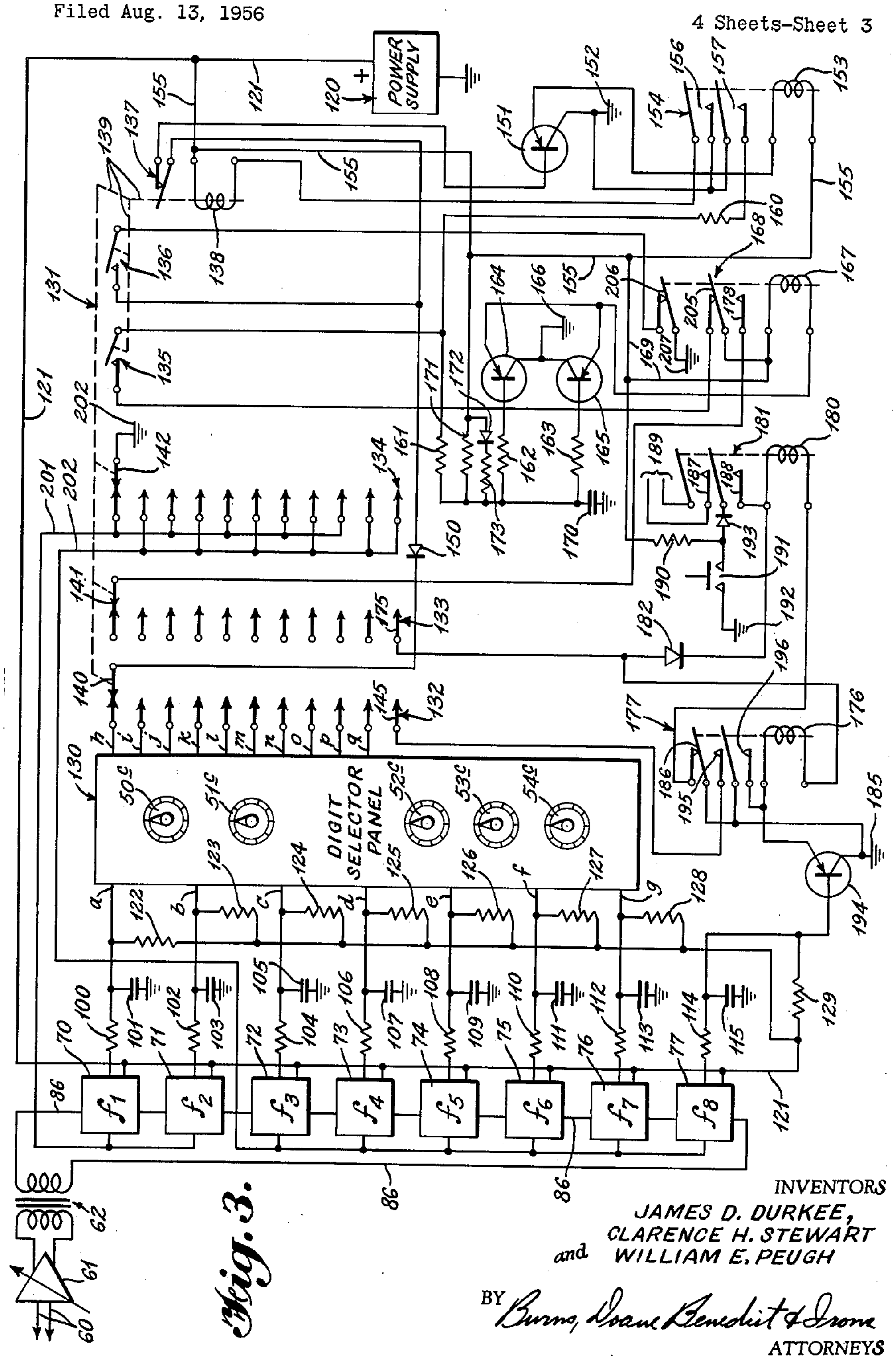
FIGURE 3 is a schematic wiring diagram of a receiver for use with the selective calling system of this invention.

A schematic wiring diagram of the receiver is shown on FIGURE 3 of the drawings. Certain detailed elements and features of such receiver are shown on FIGURES 4 and 5, while the digit selector panel employed in the selective calling system receiver is similar in its construction to panel 36 as employed in the transmitter described above and illustrated in detail on FIGURE 2.

The incoming audio signals are fed to the receiver through audio input leads 60. It will be appreciated that these signals in a radio communication type system will have been demodulated from the carrier wave as originally transmitted or in a wire circuit will be received direct from a transmitter such as described hereinabove. The signals are amplified and maintained at a constant level by a limiter and audio amplifier 61 and transformed to the appropriate impedance for the frequency responsive means by an audio transformer 62. The secondary of transformer 62 is connected in series with the drive coils of frequency responsive means in units 70, 71, 72, 73, 74, 75, 76 and 77. Each of these units is responsive and sensitive to a particular one of the eight individual frequencies employed in connection with the selective calling system of this invention. As diagrammatically represented on FIGURE 3, the units 70 through 77 are sensitive respectively to frequencies $f_1$ through $f_8$ which correspond to the frequencies of oscillators 10 through 17 as employed in the transmitter of FIGURE 1.

The receiver structure as shown on the drawings utilizes vibrating reeds as selective electromechanical devices to respond to the separate audio frequency tones used in conjunction with the calling system of this invention. These form the frequency responsive means in each of units 70 through 77. It will be readily recognized, however, that within the scope of the instant invention conventional electrical filters could be employed to detect and respond to the individual audio frequency tones so as to give an indication in the receiver of the particular tones which have been sent out by the transmitter and are received over input leads 60.

Figure 4:
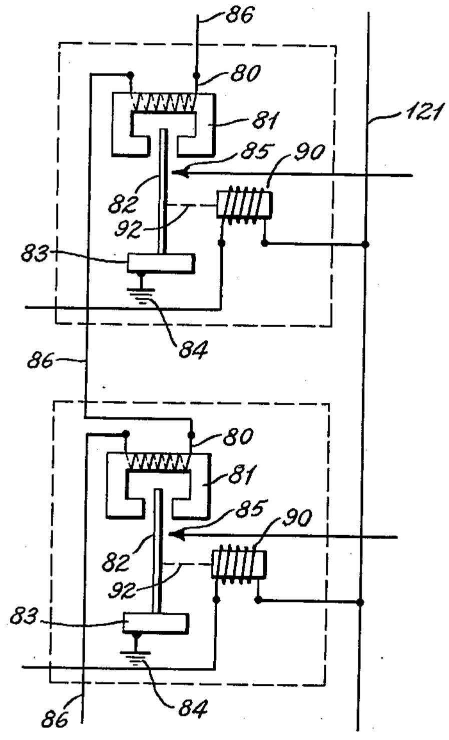
FIGURE 4 is a detailed diagrammatic view of two of the frequency responsive means and their interconnection in the circuit as employed in the receiver of FIGURE 3.
Figure 5:
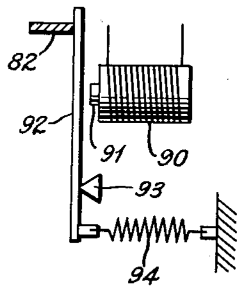
FIGURE 5 is a simplified illustration of a tuned reed quenching mechanism suitably employed with the frequency responsive means as shown in FIGURE 4.

For a better understanding of the interconnection of units 70 through 77 in the receiver, reference may be had to FIGURE 4. This figure gives a diagrammatic illustration of two of the units appropriately interconnected as embodied in the receiver. Each unit includes a drive coil 80 associated with an armature 81 so as to set up a magnetic field to excite vibration in a tuned reed 82. As is well recognized in this type of frequency responsive device, the reed 82 is tuned and so designed to respond to a particular frequency so that upon excitation of drive coil 80 in accordance with such frequency the reed 82 is caused to vibrate in resonance with such frequency. Reed 82 is mounted on a base 83 which in the circuit of the selective calling receiver is grounded at 84. A stationary reed contact 85 is mounted to be engaged by reed 82 when the reed is excited to vibration by application of proper frequency current to drive coil 80.

FIGURE 4 illustrates the manner in which the drive coils 80 of the successive frequency responsive devices are connected in series and, as referred to above, connected in circuit with the secondary of audio transformer 62 by means of lead 86.

In addition to the frequency responsive devices, each of the units 70 through 77 includes an electromechanical reed quenching device. The details of this device are somewhat diagrammatically shown in FIGURE 5 and include a coil 90 having a central armature 91 positioned adjacent a quenching arm 92 fulcrumed at 93 and urged by spring 94 to normally engage with the side edge of the tuned reed 82. Upon energization of coil 90 through a circuit, which will be described in more detail hereinafter, quench arm 92 is withdrawn from engagement with the edge of tuned reed 82, freeing the reed to vibrate in resonance with the proper frequency current as applied to its drive coil 80. Similarly, upon de-energization of coil 90, spring 94 pivots quench arm 92 back into engagement with reed 82 to quench vibration of such reed.

As previously noted, vibration of reed 82 under the effect of proper frequency current flowing in its drive coil 80 closes a circuit between reed contact 85 and ground 84. The reed contact 85 in each of the frequency responsive devices is connected to an integrating circuit. The integrating circuit for unit 70 includes resistor 100 and capacitor 101, for unit 71—resistor 102 and capacitor 103, for unit 72—resistor 104 and capacitor 105, for unit 73—resistor 106 and capacitor 107, for unit 74—resistor 108 and capacitor 109, for unit 75—resistor 110 and capacitor 111, for unit 76—resistor 112 and capacitor 113, and for unit 77—resistor 114 and capacitor 115. Potential is applied from power supply 120 through lead 121 and resistors 122, 123, 124, 125, 126, 127, 128 and 129 to the integrating circuits respectively. The functioning of such integrating circuits will be more apparent from the description given hereinafter. Suffice it to state that the intermittent contact effected when one of the tuned reeds is excited into vibration, intermittently grounds reed contact 85 so that the integrating circuit provides an essentially constant D.C. potential level at the other side of the integrating circuit from reed contact 85 for actuating a relay circuit.

The outputs of the integrating circuits, with the exception of the integrating circuit for unit 77, are connected to digit selector panel 130. The structure of this digit selector panel corresponds generally to that employed in conjunction with the transmitter as illustrated in more detail on FIGURE 2. To simplify illustration of this invention a separate drawing of the digit selector panel 130 has not been provided, but, rather, similar alphabetical letters have been applied to the leads on FIGURE 3 to identify their connection with the correspondingly identified leads as shown on FIGURE 2. Thus, the seven leads, *a* through *g*, from the integrating circuits of units 70 through 76 are connected with corresponding leads *a* through *g* as shown on FIGURE 2. Likewise, leads *h* through *q*, extending from the movable contactors of the ganged pairs of switches 50 through 54 in the digit selector panel, are connected with leads *h* through *q* as shown on FIGURE 3. In setting up the receiver of FIGURE 3 so as to be responsive to a particular call number having five digits, in accordance with the number of pairs of ganged switches in panel 130, the knobs 50*c*, 51*c*, 52*c*, 53*c* and 54*c* will be adjusted to the appropriate successive digits of the call number. With the panel of FIGURE 2, as illustrated, incorporated into the receiver of FIGURE 3, the receiver will be set up to respond to the call number 13379.

A stepping switch 131 is provided to be responsive to the outputs of the integrating circuits as fed through digit selector panel 130. For convenience of illustration, the banks of stepping switch contacts have been illustrated in vertical lines and the off-normal contacts shown in their characteristic open condition at the home position of the stepping switch. These off-normal contacts are closed at all positions of the switch away from the home position. Suitable stepping switches for use in conjunction with the selective calling system of this invention are produced by Automatic Electric Company, as for example type 44 of this company; and C. P. Clare & Company, as for example type 11, both of Chicago, Illinois. Accordingly, detailed illustration of the stepping switch structure is considered unnecessary herein.

The general characteristics of these types of stepping switches include three parallel banks of contacts arranged in an arc of 120° with a wiper contact assembly engageable with each bank and having radial wiper contact arms at 120° spacing so that one of such arms will be successively engageable with the spaced contacts in each bank at each stepped position of the switch. The stepping action is effected by a pawl and ratchet mechanism driven by a spring wherein the spring is loaded to perform the stepping by a drive coil so that indirect drive of the stepping switch, through the spring, results from energization of the drive coil. Two sets of off-normal contacts are provided to be opened when the stepping switch wiper contact arms are at home position by cam members rotatable with the wiper contact assemblies.

Essentially the stepping switch 131 has three banks of contacts, 132, 133 and 134; two sets of off-normal contacts, 135 and 136; and one set of contacts 137, which are intermittently opened upon each energization of the stepping switch driving coil. The stepping switch driving coil 138, upon energization, effects through suitable linkage diagrammatically illustrated at 139, opening of contacts 137, stepping the wiper contacts 140, 141 and 142 one step along contact banks 132, 133 and 134, respectively and releases off-normal contacts 135 and 136 so that such latter contacts close.

The leads *h* through *q*, extending from digit selector panel 130, are connected respectively to the bank of contacts 132 on the stepping switch, with the exception of the last contact 145. Wiper contact 140 of the stepping switch is connected through diode 150 and contacts 137 to the base of transistor 151. The collector of transistor 151 is connected to ground 152 and the emitter connected to the coil 153 of relay 154. The opposite side of coil 153 is connected with the power supply through leads 155 and 121. Energization of relay 154 effects closing of its contacts 156 and 157. The former complete the circuit to ground 152 for drive coil 138 of the stepping switch, which coil is connected to the power supply 120 by leads 155 and 121. Energizing drive coil 138 steps the stepping switch to the second position, moving each of the wiper contacts 140, 141 and 142 to engage with the second contact in their respective banks. Additionally, as the stepping switch is moved from home position the off-normal contacts 135 and 136 are closed for a purpose as will be described in detail hereinafter. Contacts 137 are also opened upon energizing coil 138 to effect interruption of the energizing circuit for coil 153 through transistor 151 so that the contacts 156 and 157 of relay 154 are reopened.

During energization of coil 153 of relay 154, contacts 157 connect ground 152 through resistors 160, 161, 162 and 163 to the bases of transistors 164 and 165. The collectors of transistors 164 and 165 are connected to a common ground 166 and the emitters of these transistors connected through the energizing coil 167 of a reset relay 168 to the power supply through leads 169, 155 and 121.

Reset relay 168 has a long time constant release delay by reason of the provision of a capacitor 170 and a charging resistor 171 in the circuit to the bases of transistors 164 and 165. When contacts 157 of relay 154 open upon de-energization of coil 153 the ground through resistors 160 and 161 to capacitor 170 is removed and the capacitor charge commences to build up through charging resistor 171 which couples the capacitor to power supply 120 through leads 155 and 121. A diode 172 and resistor 173 are connected in series across resistor 171 to stabilize the charging time for capacitor 170 against possible voltage variations in the power source.

In actual construction of the selective calling system of this invention, a charging time for capacitor 170 of between 300 and 450 milliseconds has been found to be satisfactory. It will, of course, be recognized that depending upon operational requirements of the system, the time constant can be varied by utilization of an appropriate size charging resistor 171. The function of capacitor 170 serves to delay opening of relay 168, which, as will be apparent from the description below, serves to retain the receiver set to respond to the next signal tone, but releases and returns the receiver to its initial condition in the event that the proper signal frequency tone is not received within the time delay for opening relay 168.

With the stepping switch 131 moved to its second position, wiper contact 140 is in position to receive a pulse through lead *i* from the digit selector panel 130. At the same time, the quench mechanisms for the reeds in units 72 through 76 will be energized as will be explained in detail hereinafter. Assuming that the proper frequency tone is detected by one of the units 72 through 76, its integrating circuit will be connected, through the switches in the digit selector panel, to lead *i* and thence through wiper contact 140, diode 150, contacts 137, which have reclosed as coil 138 is de-energized upon opening of contacts 157 to transistor 151. The transistor will again become conductive to re-energize coil 153 of relay 154. Operation of relay 154 again steps the stepping switch 131 and again discharges capacitor 170 so that reset relay 168 is in effect recycled for another time period. Thus, if the correct frequency tones are received in succession within the charging time period of capacitor 170 through resistor 171, after recognition of each previous proper frequency tone, the stepping switch will continue to step to its final position, whereupon wiper 140 will close contact 145 and wiper 141 will close contact 175, each of these contacts being the last ones in the banks 132 and 133 respectively. The closure of contacts 141 and 175 in bank 133 connects the power supply 120 with the coil 176 of a turnoff function relay 177 through leads 121, 155, 169, contacts 178 of relay 168, wiper contact 141 and contact 75 in bank 133. It will be appreciated that the coil 167 of relay 168 has remained energized by reason of the successive proper signal tones having been received, each within the charging time constant of capacitor 170 and charging resistor 171.

Additionally, the closing of wiper contact 141 with contact 175 in the stepping switch bank 133 applies power supply potential to the coil 180 of active relay 181 through diode 182. Diode 182 is provided in the circuit to isolate the coil 176 of relay 177 and preclude its being energized by interfering signals or receipt of turnoff frequency tone $f_8$ by itself. This will insure that it can be energized only at the completion of the receipt of a correct series of calling signal tones followed by the turnoff frequency tone.

The application of voltage to the coil 180 of activate relay 181 causes such relay to be energized, since the other side of its coil is connected to ground 185 through normally closed contacts 186 of turnoff function relay 177. Thereupon contacts 187 and 188 of activate relay 181 are closed. Contacts 187 may be used to operate equipment within the receiving location through leads 189. It will, of course, be recognized that any appropriate alerting signal, such as a light, buzzer, etc., may be appropriately operated by utilizing closure of contacts 187 to effect the desired operation at the receiving station which has been called. Additionally, it will be recognized that, if desired, equipment at the called receiving station may be turned off or on, or otherwise operated by utilization of the potential, derived through contact 175, which in the illustrated embodiment is employed to operate relay 181.

Closure of contacts 188 in activate relay 181 sets up a holding circuit to the power supply 120 through resistor 190, leads 169, 155 and 121, to retain relay coil 180 energized, even after relay 168 has become de-energized upon capacitor 170 becoming charged and thus contacts 178 of such relay being opened. Relay 181 may be released by manual closing of switch 191 which connects coil 180 to ground 192, or, as will be described, the activate relay may be released by receipt of the turnoff signal tone. A diode 193 is desirably provided between switch 191 and contacts 188 to protect diode 182 against excessive current flow to ground 192 with switch 191 closed, in the event relay contacts 188 are slow in opening.

The voltage applied to coil 176 of turnoff function relay 177 sets up the deactivate circuitry to receive the turnoff signal if it is transmitted within the time constant release delay of reset relay 168. When the turnoff function is to be performed from the transmitter, the signal frequency tone $f_8$ is transmitted at the end of the proper call signals for the particular receiver to be turned off or otherwise affected. This operation is performed by manual closure of switch 37 and one revolution operation of switch 40 in the transmitter. The frequency tones of the call number are responded to by the receiver to step stepping switch 131 to the final position where potential is applied to one side of coil 176 through contact 175. Frequency tone $f_8$ follows the call signal tones before reset relay 168 is released, whereupon frequency responsive unit 77 detects such turnoff frequency tone. Upon such detection the potential on the base of turnoff transistor 194 will be reduced through integrating circuit 114—115, the transistor will become conductive and coil 176 of turnoff function relay 177 will be energized. Energization of this relay breaks the ground connection for the coil of activate relay 181 at contacts 186 and at the same time applies ground 185 to the contacts 195 and then through contact 145 in stepping switch bank 132, wiper contact 140, diode 150, contacts 137 to the base of transistor 151.

This action results in again energizing coil 153 of relay 154 in the manner described above, whereupon drive coil 138 of the stepping switch is energized to step the switch back to its home or normal position. In this respect, it is again pointed out that the illustration of stepping switch 131 on FIGURE 3 is only diagrammatic and that in the actual structure of a suitable stepping switch the wiper contacts 140, 141 and 142, when stepped from the last illustrated contacts in banks 132, 133 and 134, move to the first contacts in these banks. Similarly, this last stepping action of the stepping switch will result in camming open the off-normal contacts 135 and 136, since these contacts are open only when the stepping switch is at its home or normal position.

Turnoff function relay 177 is further provided with contacts 196 which connect one side of its coil 176 direct to ground 185 when the relay is energized. This serves as a holding circuit to maintain the relay 177 energized until stepping switch 131 completes its cycle back to the home position and insures that the circuits will be deactivated.

Attention may now be directed to the third bank of contacts 134 on stepping switch 131 which will successively be engaged by wiper contact 142, which contact is grounded at 200. This bank of contacts is utilized in connection with the operation of the reed quenching mechanism as described in connection with FIGURES 4 and 5 and as is provided within each of the units 70 through 77. From the above description, it will be appreciated that alternate ones of the frequency tones in the complete calling signal will be either of frequency $f_1$ or $f_2$. Accordingly, the quench coils 90 in units 70 and 71 should be energized to release quench arm 92 at every other position of the stepping switch where one of the frequencies $f_1$ or $f_2$ is to be responded to. Thus, the first, third, fifth, seventh and ninth contacts in bank 134 are connected together and are connected by lead 201 to energize the coils 90 in units 70 and 71. The opposite sides of these coils are connected to lead 121 from power supply 120. Thus, when wiper contact 142 is in contact with these odd-numbered common connected circuits in bank 134, the coils 90 will be energized between ground 200 and power supply 120.

Similarly, contacts two, four, six, eight and ten, together with the last contact in the bank, are connected together and connected by lead 202 to one side of each of the coils in the units 72 through 77. When wiper contact 142 is stepped to a position to engage with one of these latter mentioned contacts in bank 134 the quench coils in all of the units 72 through 77 will be energized to release their quench arms 92 so that the reeds in these units may respond to and sense the appropriate actuating frequency if and when it is received. As mentioned, the last contact in bank 134 is connected with the even-numbered contacts of the bank. This insures that when the stepping switch is at its last position the quench mechanism in unit 77, which is responsive to the turnoff frequency $f_8$, will be energized so that this unit will be conditioned to respond to receipt of the proper turnoff frequency tone.

The provision of reed quenching operable as described is of particular importance where the receiver is to respond properly to rapidly succeeding frequency tones in the call number signal. Where the audio frequency tones of the call number follow one another in rapid succession and no reed quench is provided it may happen that, for example, the reed of $f_1$ will still be vibrating to close its contacts when the stepping switch has moved to the third position, resulting in a receiver improperly detecting and responding to this reed at a time when the $f_2$ reed is intended for response in the particular called receiver at the third stepping switch position. Even where the residual reed vibration has diminished below the point where it makes contact, the vibration build-up time of a reed in response to its resonant frequency will not be the same where the drive frequency acts on the reed in phase with its residual vibration as compared with such build-up time when the drive frequency starts to act on the reed out of phase with the residual vibration remaining from the last reed operation. Thus, more reliable and accurate operation of the frequency responsive reeds results where their vibration is quenched after each operation so that in responding they build-up vibration from the stationary neutral position.

*Receiver Operation*

In the description of the receiver circuitry as given hereinabove, mention of the receiver operation has necessarily been set forth. By way of illustration the response of the receiver to a particular call number will be set forth hereinafter.

Merely for purposes of illustration it may be assumed that the digit selector panel 130 has the ganged switches therein adjusted as shown on FIGURE 2 so that the receiver will respond to the call number 13379. Also for purposes of the present illustration, it will be assumed that proper frequency tones are being transmitted in proper sequence to call the particular receiver as shown in FIGURE 3.

The integrating circuit for frequency $f_1$, resistor 100 capacitor 101, is connected through lead *a*, switch 50*a* and lead *h* to the first contact in the stepping switch bank 132. The integrating circuit resistor 104 and capacitor 105 for frequency $f_3$ is connected through lead *c*, switch 50*b* and lead *i* to the second contact in bank 132. These two contacts as so connected are set up to respond only to the frequency tones which uniquely define digit one, namely, $f_1$ and $f_3$, and any other frequency tone which may appear will not be transferred to the stepping switch by reason of the setting of the switches in the digital selector panel. To respond to the second digit in the call number, the third and fourth contacts in the stepping switch band 132 are coupled through switches 51*a* and 51*b* to the integrating circuits of frequencies $f_1$ and $f_5$. Since the third digit of the call number is the same as the second digit, namely three, the fifth and sixth contacts are also connected through their switches 52*a* and 52*b* to the integrating circuits for frequencies $f_1$ and $f_5$ respectively. Digit seven, which is the fourth digit of the call number, is represented by contacts seven and eight in the stepping switch band 132 and are respectively connected through switches 53*a* and 53*b* in the digit selector panel to the integrating circuits of frequencies $f_2$ and $f_4$. The last digit, nine, is represented by the ninth and tenth contacts on bank 132 and is connected through switches 54*a* and 54*b* respectively to the integrating circuits of the frequency responsive means for frequencies $f_2$ and $f_6$.

The receipt of the call number 13379 is initiated by the frequency tone $f_1$ being received at the input terminals 60, amplified and maintained at a constant voltage level by the limiter and audio amplifier 61 and transformed to the appropriate impedance for the drive coils of reeds 82 by the audio transformer 62. The current flowing in the series loop 86, consisting of the secondary of the audio transformer 62 and the drive coils 80, being at the resonant frequency of reed 82 in unit 70, causes this reed to vibrate and make contact. This intermittent making and breaking at the reed results in the integrating circuit of resistor 100 and capacitor 101 providing an essentially constant level voltage at the first contact in the stepping switch bank 132 through the digit selector panel as explained above. This first contact is connected through wiper contact 140, diode 150 and interrupter contacts 137, which are normally closed, to the base of drive transistor 151, whereupon the transistor becomes conductive to allow current flow in the coil of relay 154. Upon closure of the contacts of relay 154 the ground return path for stepping switch drive coil 138 is completed and also ground is applied at the bases of the long time constant control transistors 164 and 165, by way of resistors 160, 161, 162 and 163. Consequently, reset relay 168 is energized, as is the stepping switch drive coil 138. Thus, the stepping switch moves to the second position, where wiper contact 140 engages the second contact.

After a sufficient length of time has elapsed for these operations to take place, frequency $f_3$ will be received, which causes the reed 82 in unit 72 to vibrate and make contact. These contacts, after integration, are reflected through the digit selector panel at the second contact in stepping switch bank 132, which contact is now engaged by wiper contact 140. Again relay 154 is energized and the stepping switch moved to the third position while the long time constant release delay of reset relay 168 is recycled by reason of capacitor 170 being grounded when relay 154 was re-energized.

This completes recognition of the first call digit. If the second frequency which defined digit one had not been received with in the charging time of capacitor 170 through resistor 171 the stepping switch would have stepped back to its home position, as described hereinafter.

The sequence of operations as described in detail with respect to the first digit are continued so that the stepping switch 131 steps in order to the final position where wiper 140 engages contact 145 in bank 132. Since reset relay 168 remains energized for the release delay period after the response to the last call signal tone, voltage is applied to contact 175 in stepping switch bank 133 by way of wiper contact 141 causing the activate relay 181 to be energized and also setting up the deactivate or turn-off circuitry to receive the turnoff signal. In the absence of receipt of the turnoff signal within the time constant for release of relay 168, such relay is de-energized, thus closing its contacts 205 and 206, resulting in the stepping switch 131 stepping to the home position, since the off-normal contacts 135 and 136 are closed until the home position of the stepping switch is reached.

It will be readily appreciated that during the successive stepping operations of the stepping switch 131, the grounded wiper contact 142 will have successively moved across the stationary contacts of bank 134 to energize the quench coils for the first phase frequencies $f_1$ and $f_2$ as detected by units 70 and 71 when the grounded wiper contact is engaged with contacts one, three, five, seven and nine of bank 134 and similarly will have energized the quench coils in the units 70 through 77 when the grounded wiper contact 142 is engaged with contacts two, four, six, eight, ten and eleven on the stepping switch bank 134. Thus, the frequency sensitive reeds will have been freed to respond to their resonant frequency excitation at the proper time and their vibration quenched after each response.

Description will now be given as to the functioning of the off-normal contacts 135 and 136. These two contacts are employed to insure that should the receiver commence to respond to a call number having the initial digits similar to its own call number, the receiver will be returned to its normal condition when it is detected that a complete call number has not been received within the proper time interval between successive signal tones. As has been explained, when a receiver is responding to its proper call number signal tones, the reset relay 168 is continuously energized, since each signal tone is successively received within the drop-out time for such relay as set by the charging time for capacitor 170 through resistor 171. As each signal tone is detected, the time release delay for relay 168 is recycled.

While relay 168 is energized its contacts 205 and 206 are opened. If an incomplete or defective call has caused the receiver to partially respond, the stepping switch 131 will be at a position intermediate the home and last steps. Off-normal contacts 135 and 136 will be closed. When the proper signal tone to cause a further stepping action is not forthcoming within the release time of relay 168, capacitor 170 will become charged, causing relay coil 167 to be de-energized, whereupon contacts 205 and 206 are closed. Thereupon potential will be connected from power supply 120 through leads 121, 155, 169 and contacts 205 to off-normal contacts 135. The potential is applied through contacts 135 to keep capacitor 170 charged through resistor 161. With the capacitor so charged, reset relay 168 will be maintained de-energized with its contacts 205 and 206 closed.

Contacts 206 connect ground 207 through off-normal contacts 136 of the stepping switch to apply ground to the base of drive transistor 151 through contacts 137 on the stepping switch and also to the anode of diode 150. It may be pointed out that diode 150 is provided in the circuit to prevent the ground as applied through off-normal contacts 136, when reset relay 168 is de-energized, from inadvertently discharging one of the capacitors 101 through 115 in the integrating circuits for frequency detecting units 70 through 77. The ground which is thus placed on the base of the drive transistor 151 causes current to flow in the coil of drive relay 154, energizing it to cause the stepping switch coil 138 to be energized so that the stepping switch steps to the next position. By virtue of the fact that voltage is applied through off-normal contacts 135 and resistor 161 to maintain capacitor 170 charged and thereby retain relay 168 in its de-energized condition, the stepping switch will continued to step until it reaches the home position, whereupon off-normal contacts 135 and 136 are opened. This repetitive stepping action occurs by reason of the interconnection of relay 154 with contacts 137 and coil 138 of the stepping switch. Each time coil 153 of relay 154 is energized to close the circuit for stepping switch drive coil 138, stepping switch contacts 137 are in turn opened to de-energize coil 153 of relay 154 through the action of transistor 151. When the stepping switch returns to its home position, the receiver circuit is ready to receive a correct call.

It should be pointed out that the activate relay 181 and the turnoff or deactivate circuitry are not conditioned to respond when the receiver is stepped back to its home position, as may take place when erroneous or incomplete call signal tones are partially responded to, since wiper contact 141 does not have potential applied thereto when it engages contact 175 in bank 133 while contacts 178 of reset relay 168 are open, as is the case when relay 168 is de-energized during the stepping back or return to home position of the stepping switch 131. It will thus be seen that if the stepping switch is moved to the second position or through any number of the positions by erroneous signals or noise, the call will not be completed, since if at any position of the stepping switch the correct frequency tone is not received within the time constant release delay for relay 168, the stepping switch will step back to its home position. Consideration of the operation thus described shows that the system is quite invulnerable to erroneous triggering and since the only timing provides for wide safety margins, the performance under heavy noise or degrading circuit conditions will be excellent.

From the description of the invention as given hereinabove, it will be appreciated that the selective calling system may be readily expanded with a minimum of change in the apparatus construction. The digit selector panels as employed in the transmitter and in the receiver may be enlarged to accommodate call numbers of more than five digits by the mere addition of a ganged pair of digit selector switches for each additional digit above five which is to be accommodated by the system. At the same time, the rotary switch 40 in the transmitter will be provided with two more contacts for connection to the rotary contactors of each switch in the ganged pairs of the digit selector panel which are added for another digit above five in the components of the calling system.

For each additional digit in the call numbers the stepping switch in the receiver will be provided with two additional contacts in each of its banks connected into the circuit so that for a six-digit call number the stepping switch will have to respond to twelve instead of ten separate tones. Whereas a five-digit call system made in accordance with the instant invention as illustrated on the drawings provides for one hundred thousand possible call numbers, by the simple additions of elements to the system components as refrred to above to provide for a six-digit call number, one million separate receiving stations can be accommodated and selectively called in carrying into effect the practical application of the instant invention. The extreme simplicity of construction of the system components and daptability for expansion with a minimum of added elements makes for ease of servicing and repair of the over-all system.

It wil be readily appreciated that the system of this invention is easily adaptable to control functions in addition to the one provided by utilization of contact 175 of the stepping switch bank 133 as shown. Through contact 175, which is only closed when correct call number signals have been responded to, equipment may be operated, such as operating various controls on an aircraft under automatic pilot control, or opening or closing valves in a fluid flow system, or a variety of other operations performed. Likewise the turnoff or deactivate function can be employed to control the operation opposite to that effected through response of the receiver to its call number.

Having thus described our invention, what we claim is:

1. In a selective calling system employing two different frequencies to uniquely represent each digit in assigned receiver call numbers, means for generating a plurality of different frequencies to define mutually exclusive first and second-phase arrangements, signal transmitting means, a pair of digit selector switches for each digit of the call number, a call number sending switch having a circuit closing position for each selector switch, the first of each pair of digit selector switches being settable to predetermine the frequency representative of the first phase of the digit signal and the second of each pair being settable to predetermine the frequency representative of the second phase of the digit signal, said sending switch being operable to successively close its circuit closing positions and through said digit selector switches effect sequential application of the individual frequencies predetermined by the settings of said digit selector switches to said signal transmitting means as representative of the call number of the receiving station to be called, signal receiving means, a plurality of frequency responsive means each sensitive to one of said different frequencies, electric circuit means having a series of circuit closing positions connected to predetermined ones of said frequency responsive means in accordance with the frequencies making up the digit signals corresponding to the call number of the receiving station, actuating means for said electric circuit means and having its energigzing circuit rendered effective by response of said frequency responsive means as connected in predetermined order through said circuit closing positions to actuate said electric circuit means through its circuit-closing positions in sequence, and means operable upon said electric circuit means having operated through its circuit closing positions to effect a desired operation at the called receiving station.

2. In a selective calling system as recited in claim 1 wherein said call number sending switch is motor operated to operate said switch substantially uniformly through its successive circuit closing positions, and means are provided associated with said electric circuit means to render the energizing circuit of said actuating means effective to return said electric circuit means to its home starting position in the event that the proper frequencies of the call number digits are not received within a predetermined time interval between successive frequencies responded to.

3. In a selective calling system as recited in claim 1 wherein said last means includes an activate relay, said system further including a deactivate function frequency provided in said generating means, a deactivate circuit closing position on said call number sending switch, a manual deactivate function switch in series with said deactivate circuit closing position to be operable in applying said deactivate function frequency to said signal transmitting means, a deactivate function frequency responsive means sensitive to said deactivate function frequency; and deactivate relay means conditioned to operate after said electric circuit means has operated through its circuit closing positions and disposed in the energizing circuit of said activate relay to deenergize said activate relay upon receipt of said deactivate frequency with said deactivate relay means being conditioned to operate.

4. In a selective calling system employing a two-phase sequential tone signal to uniquely represent each character in assigned multiple-character receiver call numbers, signal-receiving means, a plurality of frequency-responsive means each sensitive to a different tone, electric circuit means having a series of circuit-making paths and responsive to successive actuation for sequentially establishing the paths one after another, means connecting alternate ones of said circuit-making paths with one of a predetermined number of said frequency-responsive means and with one of the remainder of said frequency-responsive means in accordance with the sequence of first and second-phase tones which represent the successive characters of the receiving station call number, additional circuit means connected through all of said circuit-making paths for operation to successively actuate said electric circuit means through said circuit-making paths in sequence upon proper sequential response to call-number frequency signals of said frequency-responsive means, said additional circuit means being rendered successively effective through said circuit-making paths whereby at each circuit-making path response of only one predetermined frequency-responsive means will enable said additional circuit means to actuate said electric circuit means to establish the next succeeding circuit-making path, and means operable upon said electric circuit means having established all of said circuit-making paths in sequence to effect a desired operation at the called receiving station.

5. In a selective calling system as recited in claim 4 wherein said means connecting said circuit-making paths with predetermined frequency-responsive means includes a call-number character-selector switch for each circuit-making path, said selector switches being settable in accordance with the characters of the receiving station call number to predetermine the sequence of particular frequencies which will be responded to be successively actuate said electric circuit means to establish said circuit-making paths in sequence.

6. In a selective calling system as recited in claim 5 wherein said selector switches are ganged in pairs, with each pair serving to pre-set one character of the receiving station call number, the first selector switch in each pair being settable to connect one of said predetermined number of said frequency-responsive means with alternate circuit-making paths of said electric circuit means and the second selector switch in each pair being settable to connect one of the remainder of said frequency-responsive means with intermediate circuit-making paths of said electric circuit means.

7. In a selective calling system as recited in claim 4 wherein said last means includes an activate circuit and said system further is provided with a deactivate function frequency-responsive means sensitive to a frequency different from the sensitive frequencies of said first-mentioned frequency-responsive means, and a de-activate circuit for interrupting the energizing circuit of said activate circuit upon response of said de-activate function frequency-responsive means, said de-activate circuit being rendered ineffective in the absence of receipt of a deactivate function frequency within a predetermined time interval following the last frequency of the call number signals.

8. Equipment for receiving and recognizing incoming intelligible functional signals, each of which is a plural frequency time sequence signal comprised of a plurality of tones transmitted in time sequence as first and second-phase sequentially timed signal components, a plurality of reeds each tuned to a different frequency in accordance with the frequencies of the tones to be received, electric circuit means controlled by said reeds operable in sequence from a normal condition in response to the receipt of a particular first-phase signal component followed within a predetermined time interval by a particular second-phase signal component to recognize the functional signal defined thereby, means rendering the electric circuit means ineffective to recognize a second-phase signal component in the absence of prior actuation thereof by a first-phase signal component, means effective upon initial response of the electric circuit means for restoring the electric circuit means to its normal condition upon an interruption in the pattern of the incoming signals for longer than said predetermined time interval, means for quenching vibration of each reed, and means responsive upon each actuation of said electric circuit means for actuating said quenching means to prepare the reeds for again actuating said electric circuit means in accordance with the following signal combination.

9. Equipment for receiving and recognizing intelligible functional signals, each of which is a plural frequency time sequence signal comprised of a plurality of tones transmitted in time sequences as first and second sequentially timed signal phases, said equipment comprising a first group of tuned frequency-sensitive reeds each responsive to a different signal tone of said first signal phase, a second group of tuned frequency-sensitive reeds each responsive to a different signal tone of said second signal phase, first-phase electric circuit means distinctively operable in response to the receipt of a first-phase signal tone to which a reed of said first group responds, second-phase electric circuit means distinctively operable in response to the receipt of a second-phase signal tone to which a reed of said second group responds, means connecting said first and second-phase electric circuit means and operable in sequence thereby from a normal condition in response to the receipt of a particular first signal phase followed within a predetermined time interval by a particular second signal phase to recognize the functional signal defined thereby, said connecting means including means operable in response to initial operation of said connecting means for restoring the connecting means to normal condition upon an interruption in the pattern of the incoming signals for longer than said predetermined time interval, first and second means for quenching vibration of the reeds in said first and second group of reeds, respectively, and means responsive to successive actuations of said connecting means by said electric circuit means for actuating said first and second quenching means alternately for quenching the second group of reeds during a first-phase tone and for quenching the first group of reeds during a second-phase tone.

10. Equipment for receiving and recognizing intelligible functional signals, each of which is a plural frequency time sequence signal comprised of a plurality of tones transmitted in time sequence as first and second sequentially timed signal phases, said equipment comprising a first group of tuned frequency-sensitive reeds each responsive to a different signal tone of said first signal phase, a second group of tuned frequency-sensitive reeds each responsive to a different signal tone of said second signal phase, first-phase electric circuit means distinctively operable in response to the receipt of a first-phase signal tone to which a reed of said first group responds, second-phase electric circuit means distinctively operable in response to the receipt of a second-phase signal tone to which a reed of said second group responds, means connecting said first and second-phase electric circuit means and operable in sequence thereby from a normal condition in response to the receipt of a particular first signal phase followed within a predetermined time interval by a particular second signal phase to recognize the functional signal defined thereby, means rendering the connection means ineffective to actuation by said second-phase electric circuit means in the absence of prior actuation thereof by said first-phase electric circuit means, said connecting means including means operable in response to initial operation of said connecting means for restoring the connecting means to normal condition upon an interruption in the pattern of the incoming signals for longer than said predetermined time interval, first and second means for quenching vibration of the reeds in said first and second groups of reeds, respectively, and means responsive to successive actuations of said connecting means by said electric circuit means for actuating said first and second quenching means alternately for quenching the second group of reeds during a first-phase tone and for quenching the first group of reeds during a second-phase tone.

11. Equipment for receiving and recognizing incoming intelligible functional signals, each of which is a plural frequency time sequence signal comprised of individual first and second sequentially timed tones constituting first and second sequentially timed signal phases, said equipment comprising a plurality of tuned frequency-sensitive reeds each responsive to a different signal tone, means connecting said reeds into mutually exclusive first and second-phase sections corresponding to the arrangement of first and second-phase tones, first-phase electric circuit means distinctively operable in response to the receipt of a first-phase signal tone to which a reed of the first-phase section responds, second-phase electric circuit means distinctively operable in response to the receipt of a second-phase signal tone to which a reed of the second-phase section responds, means connecting said first and second-phase electric circuit means and alternately operable thereby from a normal listening condition in response to the receipt of a particular first-phase signal tone followed within a predetermined time interval by a particular second-phase signal tone to recognize the functional signal defined thereby, said connecting means including means operable in response to initial operation of said connecting means for restoring the connecting means to normal condition upon an interruption in the pattern of the incoming signals for longer than said predetermined time interval, first and second means for quenching vibration of the reeds in said first and second sections of reeds, respectively, and means responsive to successive actuations of said connecting means by said electric circuit means for actuating said first and second quenching means alternately for quenching the second section of reeds during a first-phase signal tone and for quenching the first section of reeds during a second-phase signal tone.

12. In a selective calling system for receiving intelligible functional signals, each of which is a plural frequency time sequence signal comprised of first and second sequentially timed tones constituting first and second sequentially timed signal phases, signal-receiving means, a plurality of frequency-responsive means each sensitive to a different tone, electric circuit means having a series of circuit-making paths and responsive to successive actuation for sequentially establishing the paths in serial order, said paths being identified in two separate sets with successive paths of one set alternating with successive paths of the other set, means connecting said paths to individual frequency-responsive means in accordance with the sequence of first and second-phase tones which represent the successive characters of the receiving station call number and including first means individually connecting each path of one set with a selected one of a predetermined number of said frequency-responsive means and second means individually connecting each path of the other set with a selected one of the remainder of said frequency-responsive means, additional circuit means connected through all of said circuit-making paths for operation to successively actuate said electric circuit means through said circuit-making paths in sequence upon proper sequential response to call-number frequency signals of said frequency-responsive means, said additional circuit means being rendered successively effective through said circuit-making paths whereby at each circuit-making path response of only one predetermined frequency-responsive means will enable said additional circuit means to actuate said electric circuit means to establish the next succeeding circuit-making path, and means operable upon said electric circuit means having established all of said circuit-making paths in sequence to effect a desired operation at the called receiving station.

13. A selective calling system comprising a sender, and a plurality of receivers, each of which bears a multiple-character call designation, selectively responsive to distinctive call signals from the sender, said sender having means for generating and transmitting a call signal for any one of said receivers, each call signal comprising a number of sequentially timed signal combinations corresponding to the number and order of the successive characters in each call designation such that there is one signal combination for each character, with each signal combination comprising individual first and second sequentially timed tones constituting first and second sequentially timed signal phases, the first and second phase tones defining mutually exclusive tone sections, said last-named means including means for generating a plurality of distinctive tones arranged in said mutually exclusive sections and means for sequentially transmitting a single tone from each of said sections to successively form each successive signal combination of any desired call signal, and each receiver having means for sequentially responding to each successive individual tone in the particular call signal definitive of the call designation of such receiver.

References Cited in the file of this patent

UNITED STATES PATENTS

| | | |
|---|---|---|
| 1,326,727 | Hammond | Dec. 30, 1919 |
| 1,476,003 | Martin | Dec. 4, 1923 |
| 1,786,805 | Wensley | Dec. 30, 1930 |
| 2,211,020 | Marrison | Aug. 13, 1940 |
| 2,357,925 | Appel | Sept. 12, 1944 |
| 2,397,539 | Dent | Apr. 2, 1946 |
| 2,398,761 | Aiken | Apr. 23, 1946 |
| 2,470,145 | Clos | May 17, 1949 |
| 2,513,342 | Marshal | July 4, 1950 |
| 2,523,315 | Mayle | Sept. 26, 1950 |
| 2,538,994 | Dampach | Jan. 23, 1951 |
| 2,558,888 | Trimble | July 3, 1951 |
| 2,563,127 | McGoffin | Aug. 7, 1951 |
| 2,666,196 | Kingsley et al. | Jan. 12, 1954 |
| 2,675,544 | Trimble | Apr. 13, 1954 |
| 2,701,279 | Lovell et al. | Feb. 1, 1955 |
| 2,739,298 | Lovell | Mar. 20, 1956 |
| 2,794,068 | Coquelet | May 28, 1957 |
| 2,826,638 | Large et al. | Mar. 11, 1958 |

UNITED STATES PATENT OFFICE

CERTIFICATE OF CORRECTION

Patent No. 3,035,250 May 15, 1962

James D. Durkee et al.

It is hereby certified that error appears in the above numbered patent requiring correction and that the said Letters Patent should read as corrected below.

Column 17, line 30, for "be", second occurrence, read -- to --; column 18, line 10, for "sequences" read -- sequence --.

Signed and sealed this 4th day of September 1962.

(SEAL)
Attest:

ERNEST W. SWIDER
Attesting Officer

DAVID L. LADD
Commissioner of Patents